US012680803B2

(12) United States Patent
    Erdfarb

(10) Patent No.:     US 12,680,803 B2
(45) Date of Patent:       Jul. 14, 2026

(54) MEASURING DEVICE

(71) Applicant: J&A Development Associates, Inc.,
                Teaneck, NJ (US)

(72) Inventor:  Jeffrey Erdfarb, Teaneck, NJ (US)

(73) Assignee: J&A Development Associates, Inc.,
               Teaneck, NJ (US)

( * ) Notice:   Subject to any disclaimer, the term of this
                patent is extended or adjusted under 35
                U.S.C. 154(b) by 351 days.

(21) Appl. No.: 18/232,254

(22) Filed:     Aug. 9, 2023

(65)            Prior Publication Data

US 2024/0247924 A1      Jul. 25, 2024

Related U.S. Application Data

(60) Provisional application No. 63/385,067, filed on Jan.
     25, 2023.

(51) Int. Cl.
     *G01B 3/00*          (2006.01)
     *G01B 3/1003*        (2020.01)

(52) U.S. Cl.
     CPC ...........  *G01B 3/1003* (2020.01); *G01B 3/006*
                                                  (2013.01)

(58) Field of Classification Search
     CPC ..... G01B 3/1003; G01B 3/006; G01B 3/1089
     See application file for complete search history.

(56)            References Cited

U.S. PATENT DOCUMENTS 184,537  A    11/1876  May
     1,085,905  A     2/1914  Hagey

| | | |
|---|---|---|
| 1,235,801 A | 8/1917 | Hornig |
| 1,497,492 A | 6/1924 | Engel |
| 1,528,992 A | 3/1925 | Rose |
| 1,602,490 A | 10/1926 | Homan |
| 2,124,550 A | 7/1938 | Evans |
| 2,468,191 A | 4/1949 | Fullilove |
| 2,673,399 A | 3/1954 | Raeder |
| 2,692,437 A | 10/1954 | Cook |
| 3,270,421 A | 9/1966 | Jones |
| 3,419,962 A | 1/1969 | Warner |
| 3,837,569 A | 9/1974 | Bradbury et al. |
| 4,314,408 A | 2/1982 | Shoemaker |
| 4,484,395 A | 11/1984 | Samuels |
| 4,495,709 A | 1/1985 | Mainenti |
| 4,696,110 A * | 9/1987 | Walker .................... G01B 3/02 |
| | | 33/759 |
| 4,811,489 A | 3/1989 | Walker |
| 5,230,158 A | 7/1993 | Wall |
| 5,251,382 A | 10/1993 | Hellar |
| 5,519,943 A | 5/1996 | Snyder |
| 5,746,001 A | 5/1998 | Fisher |

(Continued)

FOREIGN PATENT DOCUMENTS

GB          2504755 A       2/2014

*Primary Examiner* — Yaritza Guadalupe-Mccall
(74) *Attorney, Agent, or Firm* — Weber Rosselli &
Cannon LLP

(57)            ABSTRACT

A tape measure including a housing configured to receive a
flexible tape, a spring mechanism configured to allow
extraction of at least a portion of the tape from the housing
and retraction of the tape into the housing, a first fractional
indicia along a first edge on a first side of the tape, and a first
scale indicia along a second edge on the first side of the tape,
wherein the first scale indica extends at least about 36 inches
along the second edge from a 0 point of the tape.

16 Claims, 5 Drawing Sheets

(56) References Cited

U.S. PATENT DOCUMENTS

| | | | | |
|---|---|---|---|---|
| 5,875,557 | A | 3/1999 | Ueki | |
| 5,884,408 | A | 3/1999 | Simmons | |
| 6,237,243 | B1 | 5/2001 | Cook | |
| RE37,212 | E * | 6/2001 | Marshall | G01B 3/004 |
| | | | | 33/759 |
| 6,467,180 | B1 | 10/2002 | Chan | |
| 6,470,582 | B1 | 10/2002 | Renko | |
| 6,523,275 | B2 * | 2/2003 | Medford | E04D 15/025 |
| | | | | 33/759 |
| 6,530,159 | B2 | 3/2003 | Tarver, III | |
| D503,637 | S | 4/2005 | Noel | |
| 6,962,002 | B2 * | 11/2005 | Panosian | G01B 3/1084 |
| | | | | 33/760 |
| 7,055,260 | B1 * | 6/2006 | Hoffman | G01B 3/1056 |
| | | | | 33/759 |
| 7,343,694 | B2 * | 3/2008 | Erdfarb | G01B 3/004 |
| | | | | 33/759 |
| 7,594,341 | B2 * | 9/2009 | Erdfarb | G01B 3/004 |
| | | | | 33/759 |
| 7,963,046 | B2 | 6/2011 | Fratti et al. | |
| 8,806,770 | B2 | 8/2014 | Steele et al. | |
| 8,863,399 | B2 | 10/2014 | Steele et al. | |
| D733,597 | S | 7/2015 | Hyma et al. | |
| 9,080,849 | B2 | 7/2015 | Steele et al. | |
| 9,267,778 | B2 | 2/2016 | Burch et al. | |
| D783,429 | S | 4/2017 | Wortelboer et al. | |
| D783,430 | S | 4/2017 | Wortelboer et al. | |
| D785,475 | S | 5/2017 | Graykowski et al. | |
| D785,476 | S | 5/2017 | Graykowski et al. | |
| D787,347 | S | 5/2017 | Wortelboer et al. | |
| D788,611 | S | 6/2017 | Anderson | |
| 10,775,146 | B1 | 9/2020 | Moss | |
| 2003/0079362 | A1 * | 5/2003 | Erdfarb | G01B 3/004 |
| | | | | 33/759 |
| 2004/0055174 | A1 | 3/2004 | Hirsch, Jr. | |
| 2005/0166417 | A1 | 8/2005 | Clapper | |
| 2008/0134536 | A1 * | 6/2008 | Erdfarb | G01B 3/004 |
| | | | | 33/759 |
| 2016/0069658 | A1 * | 3/2016 | Klein | G01B 3/1003 |
| | | | | 33/760 |
| 2024/0247924 | A1 * | 7/2024 | Erdfarb | G01B 3/1003 |

* cited by examiner

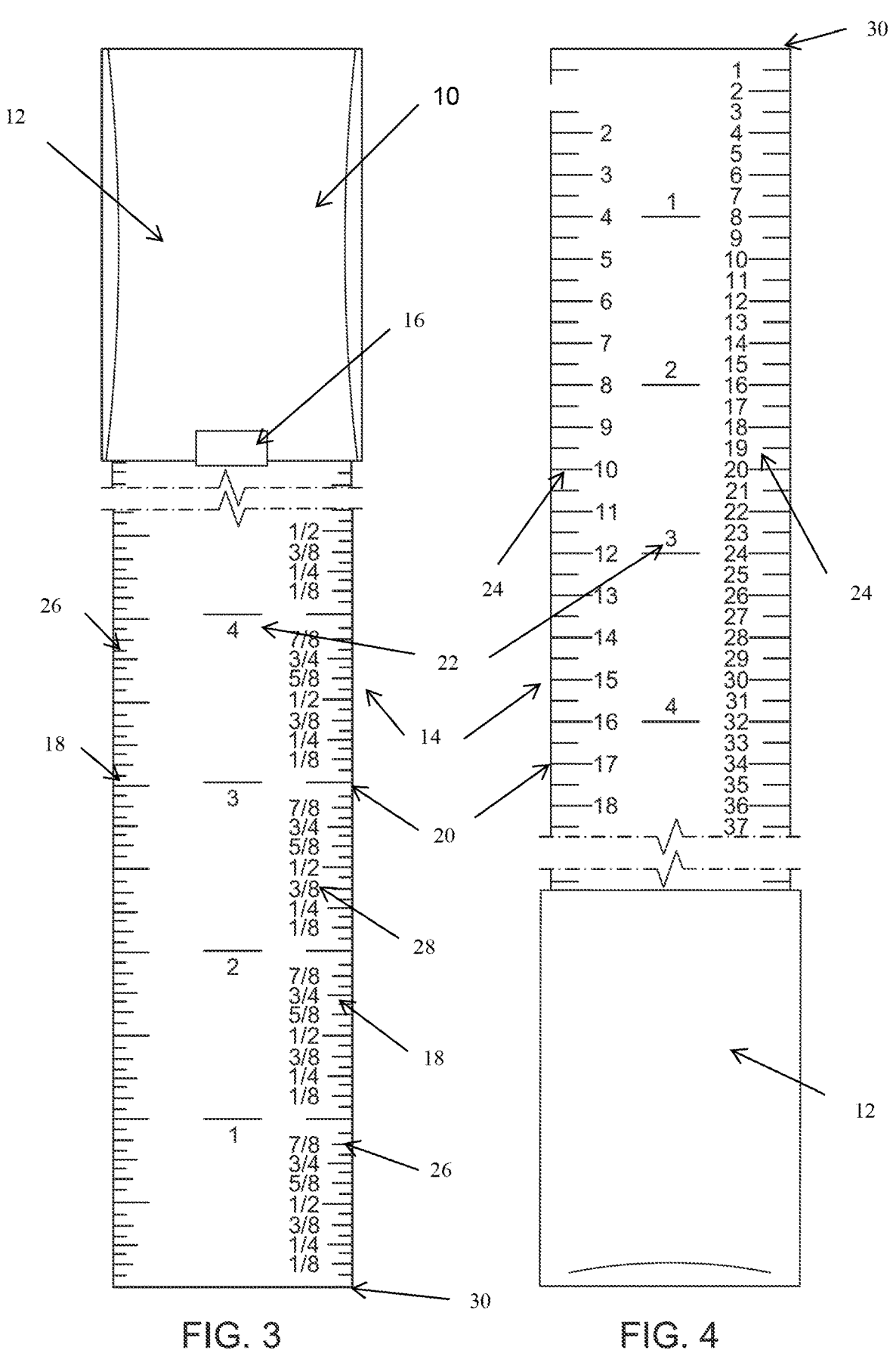
FIG. 3                                    FIG. 4

MEASURING DEVICE

CROSS REFERENCE TO RELATED APPLICATIONS

The instant application claims priority to U.S. Provisional Patent Application No. 63/385,067 filed Jan. 25, 2023, titled MEASURING DEVICE, the entire contents of which is incorporated herein by reference.

TECHNICAL FIELD

This disclosure relates generally to measuring devices, and more specifically a measuring device having indicia corresponding to various linear scales.

DESCRIPTION OF RELATED ART

There are many devices that may be employed in order to determine an actual length measurement. One such well-known device is a ruler, which is typically a solid piece of wood, plastic, or metal having indicia printed or etched thereon. The indicia usually consist of hash marks perpendicular to the edge of the ruler and positioned at a predetermined distance from a starting point of the ruler. The indicia may also consist of numerical values corresponding to the hash marks. Thus, when a user positions the ruler on an item to be measured, the user may employ the hash marks and the numerical values corresponding thereto in order to determine the actual length of the item.

Where longer lengths are to be measured a tape measure is often employed. A tape measure typically includes a thin flexible strip having indicia printed or etched thereon. The strip is typically coiled in a housing and is withdrawn from the housing in order to measure the actual length of an item. The housing may also include a locking mechanism which maintains a desired length of the strip outside of the housing while the user takes the measurement. The housing often includes a spring mechanism which retracts the strip when a user has finished taking a measurement. Because the strip is thin, a relatively long length of the strip may be disposed within a compact housing, enabling the user to determine an actual length measurement which is relatively long.

Currently, there also exist devices which have more than one scale of indicia printed or etched thereon. One such device which is employed to determine length measurements is referred to as an architect's ruler. An architect's ruler is typically about twelve inches in length and has a triangular cross-section. The triangular cross-section provides a variety of edges onto which are printed or etched various scales. For example the architect's ruler typically includes a ¼ inch scale, commonly used in residential construction, and a ⅛ inch scale commonly used in commercial construction. However, because the architect's ruler is only twelve inches long, it cannot be effectively used to measure distances that are greater than twelve inches. It also has the disadvantage that, since it has a triangular cross-section, it can be difficult to carry on the job site and does not lay flat when in use, making it cumbersome to use.

To address the shortcomings there have been developed a number of tape measures with the various scales of the architect's scale printed thereon. Indeed, the inventor of this disclosure was previously awarded two U.S. Patents related to tape measures with architect's scales incorporated thereon U.S. Pat. Nos. 7,343,694 and 7,594,341, the contents of which are incorporated herein by reference.

Nonetheless, improvements are always desired to improve accuracy, ease of use, and overall efficiency on the worksite.

SUMMARY

One aspect of the disclosure is directed to a tape measure including a housing configured to receive a flexible tape. The measure also includes a spring mechanism configured to allow extraction of at least a portion of the tape from the housing and retraction of the tape into the housing; a first fractional indicia along a first edge on a first side of the tape; and a first scale indicia along a second edge on the first side of the tape, where the first scale indica extends at least about 36 inches along the second edge from a 0 point of the tape.

Implementations of this aspect of the disclosure may include one or more of the following features. The tape measure where the fractional indicia are composed of a plurality of hash marks along the first edge of the tape. The fractional indicia include actual fractional values. The first scale indicia is a ¼ inch scale indicia. The first scale indicia is a ⅛ inch scale indicia. The full indicia are oriented perpendicular to a longitudinal axis of the tape. The first scale indicia extend about 48 inches along the second edge from the 0 point of the tape. The second scale indica extends about 36 inches along the second edge from a 0-point of the tape measure. The second fractional indicia are composed of a plurality of hash marks along the first edge of the tape. The second fractional indicia include actual fractional values. The second scale indicia is a ¼ inch scale indicia. The second scale indicia is a ⅛ inch scale indicia. The second full indicia are oriented perpendicular to a longitudinal axis of the tape. The second scale indicia extend about 48 inches along the second edge from the 0 point of the tape.

A further aspect of the disclosure is directed to a tape measure including a housing configured to receive a flexible tape. The measure also includes a spring mechanism configured to allow extraction of at least a portion of the tape from the housing and retraction of the tape into the housing; a first fractional indicia along a first edge on a first side of the tape; a second fractional indica along a second edge of the first side of the tape, where the second fractional indicia include actual fractional values, a first scale indicia along a first edge on a second side of the tape starting at a 0 point of the tape; and a second scale indicia along a second edge on a second side of the tape starting at the 0 point of the tape.

Implementations of this aspect of the disclosure may include one or more of the following features. The tape measure where the first scale indicia and the second scale indicia extend about 36 inches from the 0-point of the tape measure. The first scale indicia and the second scale indicia extend about 48 inches from the 0-point of the tape measure. The full indicia are oriented perpendicular to a longitudinal axis of the tape. The first scale indicia is a ¼ inch scale and the second scale indicia is a ⅛ inch scale.

Still a further aspect of the disclosure is directed to a tape measure including a housing configured to receive a flexible tape. The measure also includes a spring mechanism configured to allow extraction of at least a portion of the tape from the housing and retraction of the tape into the housing; a first fractional indicia along a first edge on a first side of the tape; a first scale indicia along a second edge on the first side of the tape, where the first scale indica extends about 48 inches along the second edge from a 0 point of the tape; a second fractional indicia along a first edge on a second side of the tape; and a second scale indicia along a second edge on the second side of the tape, where the second scale indica extends about 48 inches along the second edge from a 0-point of the tape measure.

BRIEF DESCRIPTION OF THE DRAWINGS

Various aspects and of the disclosure are described here-inbelow with references to the drawings, wherein:

FIG. 3 depicts a top view of a tape measure with standard and fractional indicia;

FIG. 4 depicts a bottom view of a tape measure with standard indices combined with ⅛" and ¼" scale indicia;

DETAILED DESCRIPTION

As noted above, there have been prior tape measures which depicted both standard measurement indicia and scaled measurement indicia (e.g., architect's scale indicis). Some of these tape measures even met with commercial success. However, it has been observed that some of the commercial embodiments of the combination of standard indicia and scaled indicia have resulted in very difficult to read tape measures making them difficult to read. This can occur for example where the ¼ inch scale and the ⅛ inch scale are along the same edge of the tape measure, as at least one commercial tape measure provided.

Additionally, some commercial examples had the scaled indicia displayed for only about a foot in length, much like a traditional architect's rule. Unfortunately, as noted above, with standard drawings typically being about 4 feet in length, depiction of such a short section of scaled indicia meant that inaccuracies in the measurement of the plan are inevitable as the tape measure had to be moved along the plans. Still further, other examples started the scaled indicia at for example the 1 or 2-foot point along the tape and not at a 0-point where tape measures are typically used. Again, this led to inaccuracies as well as making the use of the scaled indicia cumbersome.

Figures 1, 2:
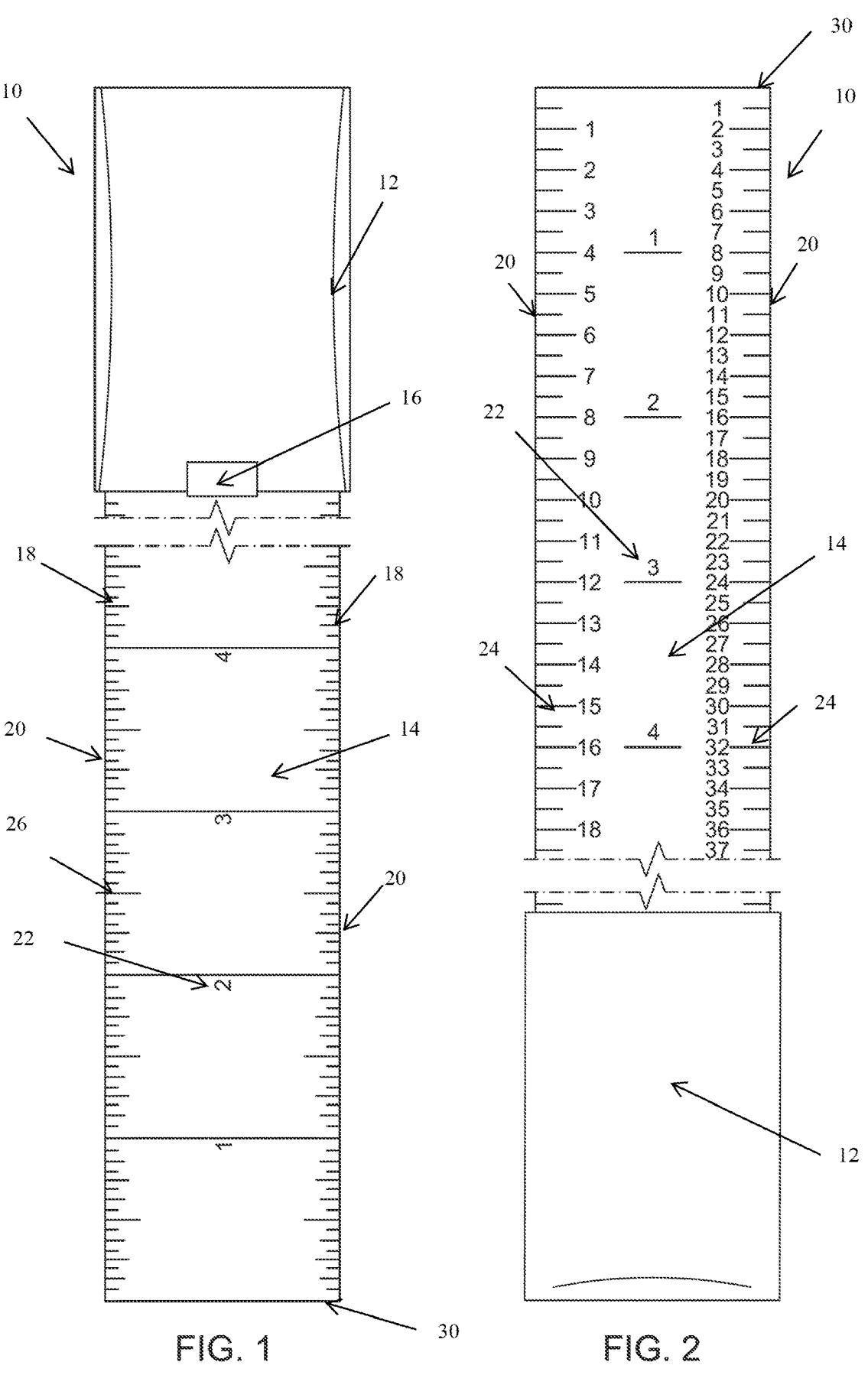
FIG. 1 depicts a top view of a tape measure with standard indicia.
FIG. 2 depicts a bottom view of a tape measure with standard indicia combined with ⅛" and ¼" scale indicia.

FIG. 1 depicts a top view of a tape measure 10. The tape measure includes a housing 12 including therein a spring mechanism (not shown) allowing the tape 14 to be extracted from the housing 12 and returning the tape 14 to the housing 12. A lock 16 can be manually triggered to prevent the spring mechanism from retracting the tape 14 within the housing 12. Alternatively, the tape measure 10 may automatically lock the tape 14 in place when extended and the lock 16 is actually a release mechanism, where activation from its normal position allows the tape 14 to be retracted into the housing 12.

As shown in FIG. 1 the tape 14 includes standard fractional indicia 18 extending along both edges 20 of the tape. The full indicia 22 are shown along a midline of the tape 14 oriented to be read parallel to the longitudinal axis of the tape 14.

FIG. 2 depicts a bottom view of the tape measure 10 of FIG. 1. Rather than the traditional hash marks for the fractional indicia 18 as shown in FIG. 1 along each of the edges 20 of the tape 14, there are the. Along a first edge is the ¼ inch scale indicia 24 and along a second edge is a ⅛ inch scale indicia. Both the scale indicia 24 and the full indicia are depicted in FIG. 2 measure length in inches. Specifically, the ¼" scale is useful for taking measurements from plans or blueprints that are drawn at a ¼" to 1 inch scale. Similarly, the ⅛" scale is useful for taking measurements from plans or blueprints that are drawn at a ⅛" to 1 inch scale. Further, though shown here using imperial units (e.g., inches) the disclosure is not so limited and the full indicia and scale indicia may employ metric units (e.g., millimeters, centimeters and meters) without departing from the scope of the disclosure. Similar to FIG. 1 the full indicia 22 are depicted along a midline of the tape 14. However, unlike FIG. 1 the orientation of the full indicia 22 is such that they are oriented to be read perpendicular to the longitudinal axis of the tape 14. The orientation of the full indicia 22 is the same as the scale indicia 24. Further, though depicted in FIGS. 1 and 2 as the front and back sides of the tape 14, respectively, the orientation may be reversed without departing from the scope of the disclosure.

FIGS. 3 and 4 depict a tape measure 10 in accordance with the disclosure. FIG. 3 depicts traditional fractional indicia 18 employing hash marks 26 of different lengths to indicate the various factions between any two full indicia 22 along a first edge of the tape 14. However, as anyone who has worked in the trades has unfortunately discovered, these hash marks 26 have proven to be more and more confusing, particularly to younger workers in the field. Accordingly, on a second edge 20 of the tape 14 the actual fractional values 28 are depicted alongside the hash marks 26. FIG. 4 is substantially the same as FIG. 2 and its description will not be repeated here for brevity. Both FIGS. 1 and 2 and FIGS. 3 and 4 depict a complete tape measure 10 with the indicia printed on both sides (top and bottom) of the tape 14. The disclosure is not so limited and in accordance with the disclosure the indicia may only be printed on a single side, generally the top or front side, of the tape 14.

Figure 5:
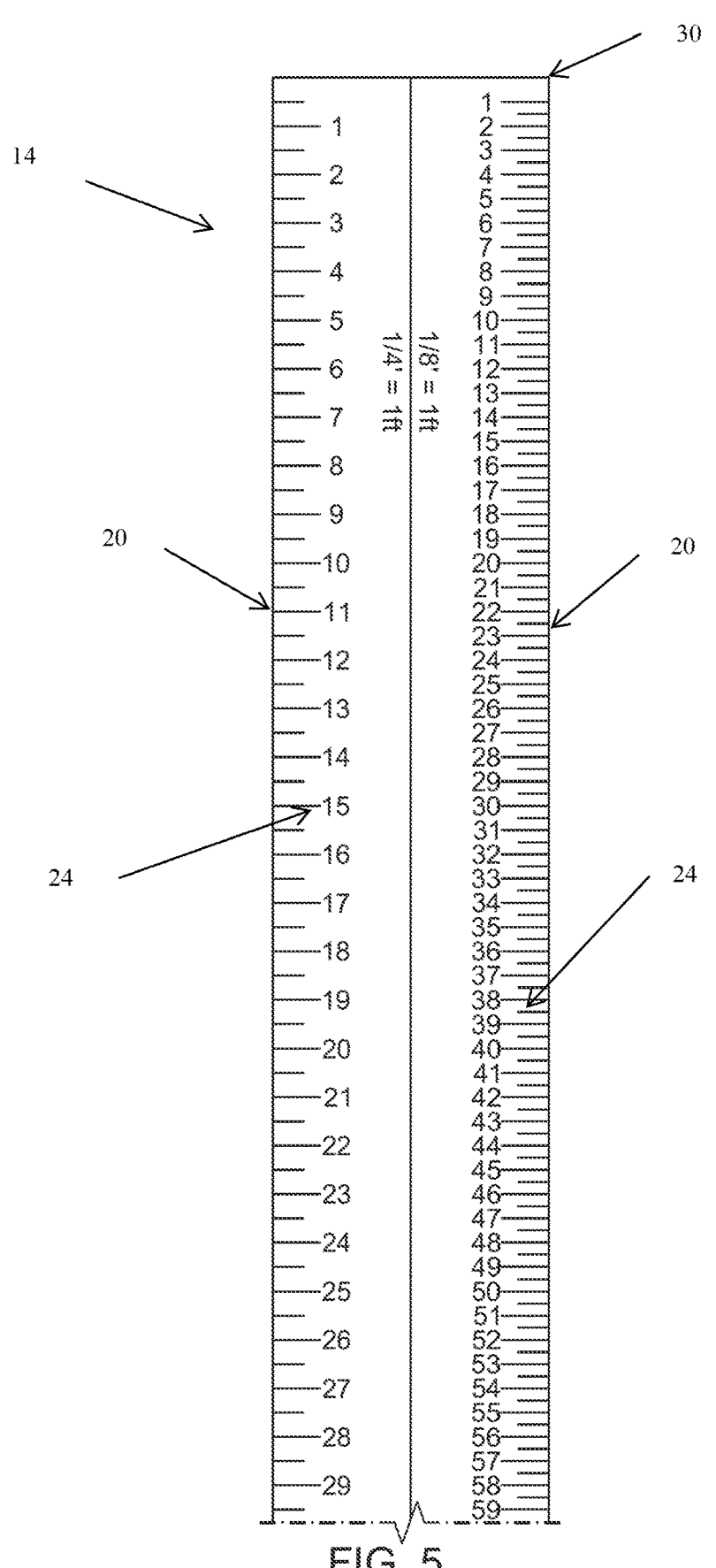
FIG. 5 depicts a tape for a tape measure with ⅛" and ¼" scale indicia.

FIG. 5 depicts another aspect of the disclosure. In FIG. 5 the scale indicia 24 are presented along individual edges 20 of the tape 14. In this way, a user measuring on drawings of ¼" scale can employ an edge 20 of the tape 14 where only the scale indicia 24 are visible. This clarity promotes accuracy when measuring plans and blueprints as there are no unnecessary markings along the side of the tape 14 being employed. The same is true for the ⅛$^{th}$ scale indicia 24 and the edge along which they are presented. The tape 14 of FIG. 5 may be the only indicia on the tape 14 or may be presented in combination with one of the other orientations of indicia as described herein.

Figures 6, 7:
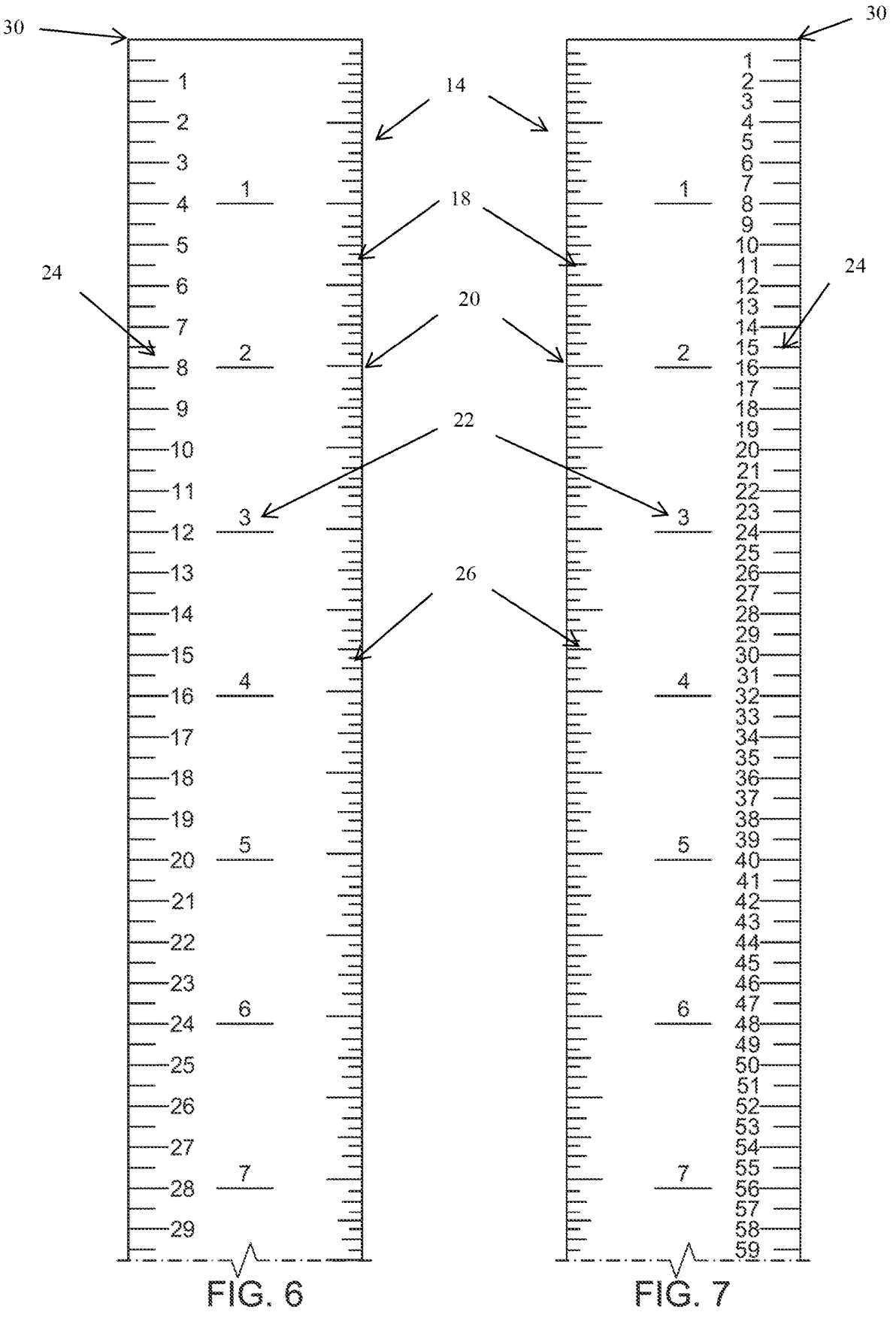
FIG. 6 depicts a tape for a tape measure with ¼" scale indicia.
FIG. 7 depicts a tape for a tape measure with ⅛" scale indicia.

FIGS. 6 and 7 depict additional tapes 14 in accordance with the disclosure. In both FIGS. 6 and 7 traditional hash marks 26 are depicted along one edge 20 of the tape 14 to depict the factional indicia 18. Along the other edge 20 of the tape 14 is one of the scale indicia 24. In FIG. 6 it is the ¼" scale indica 24 that is shown. In FIG. 7 it is the ⅛" scale indicia 24 that is shown. In both FIGS. 6 and 7 the full indicia 22 are depicted along a midline of the tape 14. The orientation of the full indicia 22, which is parallel to the orientation of the scale indicia 24 enables a user to view both indicia in the same orientation. This allows a user to perform the mental math, knowing the scale of the scale indicia 24 and compare a measured distance on a set of plans or blueprints to confirm the accuracy of the measurement. In one aspect of the disclosure, the tapes 14 in FIGS. 6 and 7 may be on opposite sides of a single tape 14. In this way a user has access to a tape measure 10 with the two most common scale measurement indicia 24 available in a clear manner on opposite sides of the tape 14, and also has the ability to use the full indicia 22 on either side of the tape 14.

Figure 8:
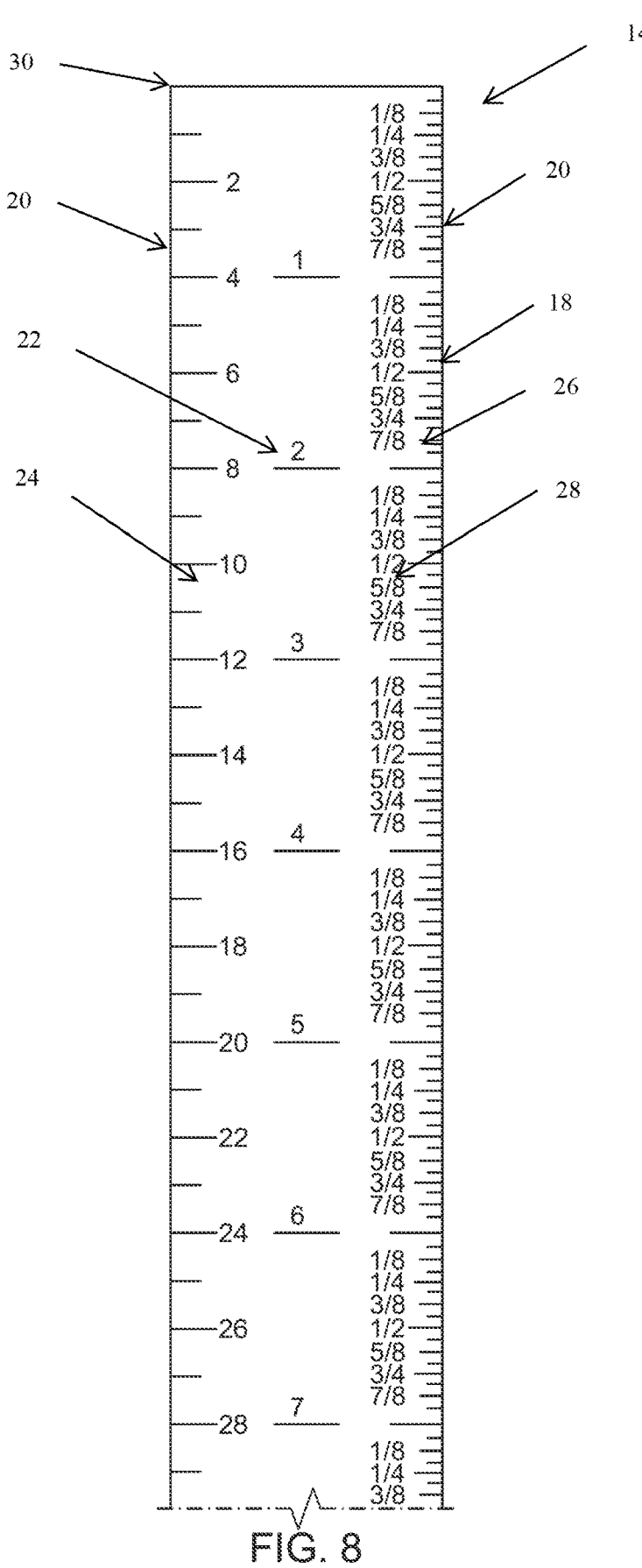
FIG. 8 depicts a tape for a tape measure with standard and fractional indicia combined with ¼" scale indicia.

FIG. 8 depicts a further aspect of the disclosure. In FIG. 8 the tape 14 includes the scale indicia 24 along a first edge 20. Along the second edge 20 the actual fractional values 28 are depicted alongside the hash marks 26. The full indicia 22 are depicted along a midline of the tape 14. The orientation of the full indicia 22, which is parallel to the orientation of the scale indicia 24 enables a user to view both indicia in the same orientation. Though shown in FIG. 8 with the ¼" scale indicia, the ⅛" scale indica can be employed without departing from the scope of the disclosure.

Additional aspects of the disclosure include starting all of the indicia including the scale indicia 24, the full indicia 22, and the fractional indicia 18 at the 0 point 30 of the tape measure 10. Alternatively, the scale indicia 24 starts at any point between the 0 point and about 9 inches from the end of the tape 14. This eases use of the tape measure 10 when measuring plans and blueprints as well as undertaking real life measurements. Further, the scale indicia 24 are continued for length of the tape 14 for the same length as common blueprint and plan dimensions. In one aspect of the disclosure the scale indicia 24 extend 48 inches along the length of the tape 14. In a further aspect of the disclosure the scale indicia 24 extend 36 inches along the length of the tape 14 from the starting point (e.g., between 0 and 9 inches along the tape 14.) In an additional aspect of the disclosure the full indicia 22 and the fractional indicia 18 are on one side of the tape 14 and at least one scale indicia on a second side of the tape 14.

While detailed aspects are disclosed herein, they are merely examples of the disclosure, which may be embodied in various forms and aspects. Therefore, specific structural and functional details disclosed herein are not to be interpreted as limiting, but merely as a basis for the claims and as a representative basis for teaching one skilled in the art to variously employ the disclosure in virtually any appropriately detailed structure.

The invention claimed is:

1. A tape measure comprising:
a housing configured to receive a flexible tape;
a spring mechanism configured to allow extraction of at least a portion of the tape from the housing and retraction of the tape into the housing;
a first fractional indicia along a first edge on a first side of the tape; and
a first scale indicia along a second edge on the first side of the tape
wherein the first fractional indicia comprise a plurality of hash marks and corresponding fractional values;
wherein the first scale indicia comprises an architectural scale selected from a ¼-inch scale or a ⅛-inch scale;
wherein the first scale indicia begins at a 0-point of the tape;
wherein the first scale indicia extends continuously for at least 36 inches along the second edge; and
wherein the second edge is free of fractional indicia.

2. The tape measure of claim 1, further comprising full indica along a centerline of the tape, wherein the full indicia are oriented perpendicular to a longitudinal axis of the tape.

3. The tape measure of claim 1, wherein the first scale indicia extend about 48 inches along the second edge from the 0 point of the tape.

4. The tape measure of claim 1, further comprising a second fractional indicia along a first edge on a second side of the tape; and
a second scale indicia along a second edge on the second side of the tape
wherein the second fractional indicia comprise a plurality of hash marks and corresponding fractional values;
wherein the second scale indicia comprises an architectural scale selected from a ¼-inch scale or a ⅛-inch scale;
wherein the second scale indicia begins at a 0-point of the tape;
wherein the second scale indicia extends continuously for at least 36 inches along the second edge; and
wherein the second edge is free of fractional indicia.

5. The tape measure of claim 4, further comprising a second full indica along a centerline of the second side of the tape, wherein the second full indicia are oriented perpendicular to a longitudinal axis of the tape.

6. The tape measure of claim 4, wherein the second scale indicia extend about 48 inches along the second edge from the 0 point of the tape.

7. The tape measure of claim 4, wherein the first scale indicia and the second scale indicia are disposed on opposite sides of the tape such that only one of the first scale indicia or the second scale indicia is visible at a time.

8. The tape measure of claim 1, wherein the first scale indicia are oriented perpendicular to a longitudinal axis of the tape.

9. The tape measure of claim 1, wherein the first fractional indicia and the first scale indicia are disposed on the same side of the tape but on different edges.

10. A tape measure comprising:
a housing configured to receive a flexible tape;
a spring mechanism configured to allow extraction of at least a portion of the tape from the housing and retraction of the tape into the housing;
a first fractional indicia along a first edge on a first side of the tape;
a second fractional indica along a second edge of the first side of the tape, wherein the second fractional indicia include actual fractional values;
a first scale indicia along a first edge on a second side of the tape starting at a 0 point of the tape; and
a second scale indicia along a second edge on a second side of the tape starting at the 0-point of the tape
wherein the first fractional indicia comprise a plurality of hash marks and corresponding fractional values;
wherein the second fractional indicia comprise a plurality of hash marks and corresponding fractional values;
wherein the first scale indicia and the second scale indicia each comprise an architectural scale selected from a ¼-inch scale or a ⅛-inch scale;
wherein the first scale indicia and the second scale indicia each begin at the 0 point of the tape;
wherein the first scale indicia and the second scale indicia each extend continuously for at least 36 inches along their respective edges; and
wherein each edge bearing the first scale indicia or the second scale indicia is free of fractional indicia.

11. The tape measure of claim 10, wherein the first scale indicia and the second scale indicia extend about 48 inches from the 0-point of the tape measure.

12. The tape measure of claim 10, further comprising full indica along a centerline of the second side of the tape, wherein the full indicia are oriented perpendicular to a longitudinal axis of the tape.

13. The tape measure of claim 10, wherein the first scale indicia is a ¼ inch scale and the second scale indicia is a ⅛ inch scale.

14. The tape measure of claim 10, wherein the first fractional indicia and the second fractional indicia are disposed on opposite edges of the first side of the tape.

15. A tape measure comprising:

a housing configured to receive a flexible tape;

a spring mechanism configured to allow extraction of at least a portion of the tape from the housing and retraction of the tape into the housing;

a first fractional indicia along a first edge on a first side of the tape;

a first scale indicia along a second edge on the first side of the tape, wherein the first scale indica extends about 48 inches along the second edge from a 0 point of the tape;

a second fractional indicia along a first edge on a second side of the tape; and a second scale indicia along a second edge on the second side of the tape wherein the first fractional indicia comprise a plurality of hash marks and corresponding fractional values;

wherein the second fractional indicia comprise a plurality of hash marks and corresponding fractional values;

wherein the first scale indicia and the second scale indicia each comprise an architectural scale selected from a ¼-inch scale or a ⅛-inch scale;

wherein the first scale indicia and the second scale indicia each begin at a 0-point of the tape;

wherein the first scale indicia and the second scale indicia each extend continuously for at least 36 inches along their respective edges; and wherein each edge bearing the first scale indicia or the second scale indicia is free of fractional indicia.

16. The tape measure of claim 15, wherein the first scale indicia and the second scale indicia are each uninterrupted along their respective edges between the 0-point and at least 36 inches.

* * * * *